United States Patent [19]

Rumpf

[11] Patent Number: 4,738,485
[45] Date of Patent: Apr. 19, 1988

[54] SEAT ASSEMBLY WITH OCCUPANT RESTRAINT SYSTEM

[75] Inventor: Robert J. Rumpf, Grosse Pointe, Mich.

[73] Assignee: TRW Vehicle Safety Systems, Inc., Lyndhurst, Ohio

[21] Appl. No.: 919,633

[22] Filed: Oct. 16, 1986

[51] Int. Cl.[4] .............................................. B60R 21/00
[52] U.S. Cl. ................................. 297/216; 297/480; 280/806
[58] Field of Search ............... 297/216, 480, 468, 470; 280/806; 296/65 A

[56] References Cited

U.S. PATENT DOCUMENTS

| | | | |
|---|---|---|---|
| 2,850,082 | 9/1958 | Day | 297/480 |
| 3,471,197 | 10/1969 | Ely | 297/216 |
| 3,552,795 | 1/1971 | Perkins et al. | 297/216 |
| 3,561,817 | 2/1971 | Needham | 297/216 |
| 3,832,002 | 8/1974 | Eggert, Jr. et al. | |
| 3,947,058 | 3/1976 | Laporte | 297/470 |
| 3,998,291 | 12/1976 | Davis | 297/216 |
| 4,159,120 | 6/1979 | Fohl | 280/806 |
| 4,257,626 | 3/1981 | Adomeit | 297/216 |
| 4,449,443 | 5/1984 | Fohl . | |

Primary Examiner—Francis K. Zugel
Attorney, Agent, or Firm—Tarolli, Sundheim & Covell

[57] ABSTRACT

An assembly for use in a vehicle includes a seat for a vehicle occupant. The seat is supported for forward movement relative to the vehicle during a collision. A seat belt retractor is mounted on the seat. Belt webbing extends from the retractor and about the occupant to restrain movement of the occupant relative to the seat. The belt webbing is retractable onto the retractor to tighten the belt webbing about the occupant. A drive retracts the belt webbing onto the retractor. An actuator responsive to movement of the seat during a collision actuates the drive to tighten the belt webbing against the occupant.

15 Claims, 4 Drawing Sheets

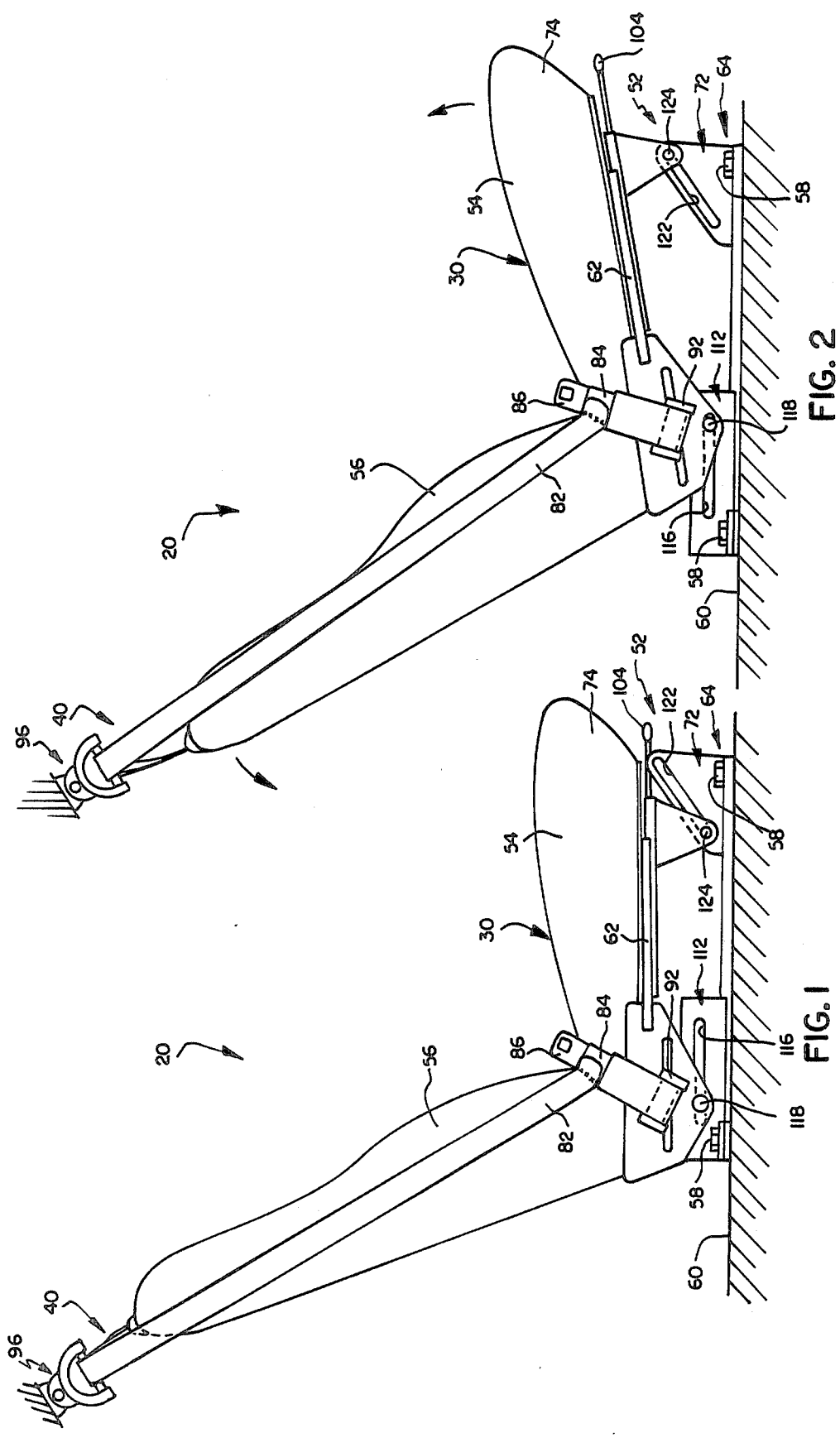

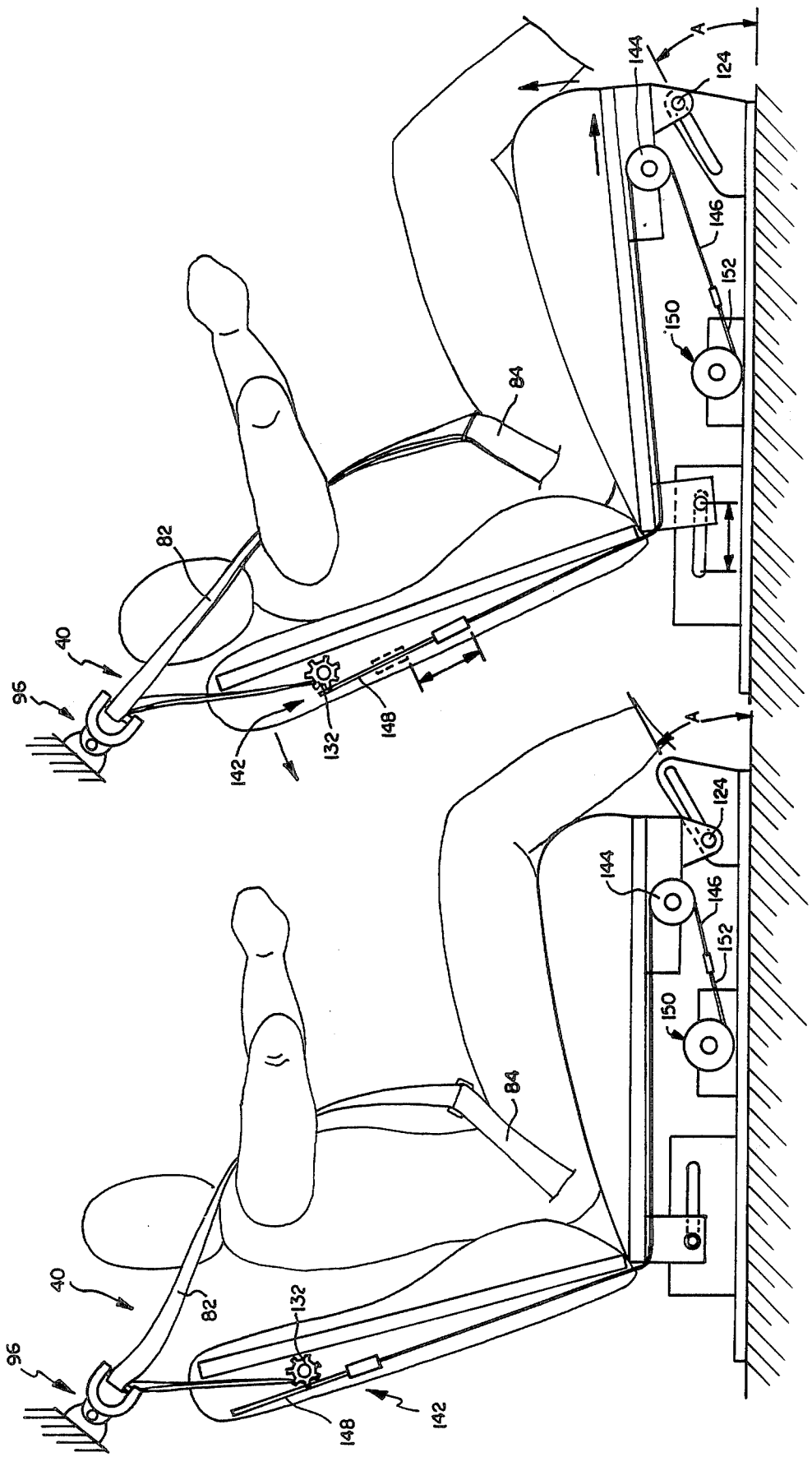

SEAT ASSEMBLY WITH OCCUPANT RESTRAINT SYSTEM

BACKGROUND OF THE INVENTION

1. Technical Field

The present invention relates to an assembly for protecting a vehicle occupant during a collision. Particularly, the present invention relates to a vehicle seat which moves during a collision to minimize occupant rebound and an occupant seat belt restraint system which is tightened about the occupant in response to the movement of the seat.

2. Description of the Prior Art

Seats which move forward during a collision to minimize occupant rebound are known, and occupant seat belt restraint systems for use in vehicles are also known. A known occupant restraint system typically includes a lap belt and a shoulder belt. Belt pretensioners that pull the shoulder belt tightly against the occupant during a collision are also known. One belt pretensioner is disclosed in U.S. Pat. No. 4,449,443. The belt pretensioner disclosed in U.S. Pat. No. 4,449,443 requires a separate energy source in the form of pressurized fluid to actuate belt tightening.

Certain belt pretensioners utilize the momentum resulting from movement of the seat to actuate belt tightening. Such a belt pretensioner is disclosed in U.S. Pat. No. 4,159,120. Upon forward seat movement during a collision, a mechanism is actuated which tightens the shoulder belt about the occupant. The belt pretensioner disclosed in U.S. Pat. No. 4,159,120, must be installed in the vehicle separate from the seat.

Belt restraint systems mounted to a seat minimize vehicle interior space occupied by the seat and belt system assembly and permit the seat and belt system to be installed in the vehicle as a unit. Such assemblies are disclosed in U.S. Pat. Nos. 3,552,795 and 3,832,002. These patents disclose a seat which is movable relative to the vehicle upon a collision. The seat includes occupant restraint seat belts connected to, and movable with, the seat. However, the belts do not tighten about the occupant during a vehicle collision.

The automotive industry has, for a long time, been working on a variety of safety concepts for protecting a vehicle occupant. The safety concepts include (i) an occupant seat which moves forward during a generally head-on collision thereby minimizing the distance of occupant rebound during the collision, and (ii) tightening a seat belt about the occupant during a collision to minimize occupant movement relative to the seat. To applicant's knowledge, however, no one has combined these safety concepts into one structure which can be installed as a unit in the vehicle thereby simplifying installation on an assembly line and limiting space requirements.

SUMMARY OF THE INVENTION

The present invention is an assembly which includes a seat and an occupant restraint system which (i) can be installed in a vehicle as a unit, (ii) moves relative to the vehicle during a collision to reduce occupant rebound, and (iii) tightens the seat belt webbing about the occupant in response to movement of the seat. The assembly of the present invention is relatively compact, thereby minimizing the space required for the assembly within the vehicle interior. The assembly should require just one installation station on a vehicle assembly line.

The present invention includes a seat for the vehicle occupant and means for supporting the seat for forward movement relative to the vehicle during a collision to minimize the distance of occupant rebound during the collision. A seat belt retractor is mounted on the seat and has belt webbing wound thereon. The belt webbing is extendable about the occupant for restraining movement of the occupant relative to the seat. The belt webbing is retractable onto the belt retractor to tighten the belt webbing about the occupant during a collision.

The assembly of the present invention includes a drive operable to tighten the belt webbing about the occupant by retracting the belt webbing onto the retractor. The assembly also includes an actuator responsive to movement of the seat during a collision for operating the drive to tighten the belt webbing against the occupant. Specifically, forward movement of the seat during a collision due to seat momentum is transmitted to the belt to tighten the belt about the occupant.

The drive includes a gear connected to and rotatable with a spool of the retractor. A drive bar meshes with the gear. A cable is connected to the drive bar and transmits seat movement to the drive bar. The drive bar thus is operable to rotate the gear upon forward movement of the seat to tighten the seat belt.

BRIEF DESCRIPTION OF THE DRAWINGS

Further features of the present invention will become apparent to those skilled in the art to which the present invention relates from a reading of the following specification made with reference to the accompanying drawings, in which:

FIG. 1 is a side view of an assembly embodying the present invention including a vehicle seat and occupant seat belt restraint system;

FIG. 2 is a side view similar to FIG. 1, illustrating the assembly in another position;

FIG. 6 is a schematic side view of an actuator mechanism embodied in the assembly of FIG. 1 illustrating the actuator mechanism in an unactuated condition;

FIG. 7 is a schematic side view similar to that of FIG. 6 illustrating the actuator mechanism in an actuated condition;

DESCRIPTION OF A PREFERRED EMBODIMENT

An assembly 20, according to the present invention, is illustrated in FIG. 1. The assembly 20 includes a seat 30 for a vehicle occupant to sit on and an occupant seat belt restraint 40. The occupant seat belt restraint 40 is attached to the seat 30. The assembly 20 provides the advantages of (i) minimizing the space required within the vehicle for the seat 30 and the restraint 40, and (ii) requiring only one installation station on an assembly line during assembly of the vehicle. When installed in the vehicle, the assembly 20 moves forward during a collision to minimize occupant rebound and tightens the occupant seat belt restraint 40 about the occupant, as described in detail below.

Figure 3:
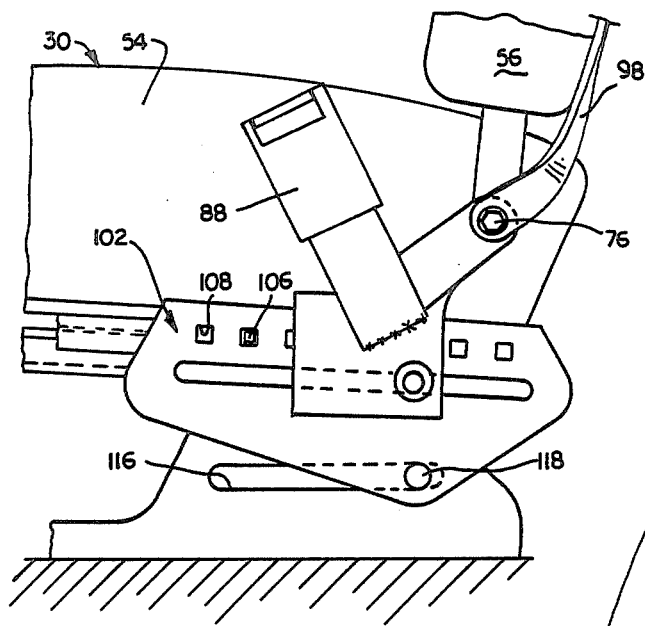
FIG. 3 is an enlarged side view of a portion of the assembly of FIG. 1.

The seat 30 includes a seat portion 54 and a backrest portion 56. The seat portion 54 and backrest portion 56 include foam padding and a fabric cover, as is known. The backrest portion 56 of the seat 30 is shown as pivotable relative to the seat portion 54 about pivot 76 (FIG. 3) and would typically be installed in two door vehicle models. The backrest 56 may be fixed to the seat portion 54, as typically would be installed in four door vehicle models. A frame 52 supports the seat 30 for movement relative to the vehicle. The frame 52 is fastened to the floor 60 of the vehicle in a known manner, such as by bolts 58.

The frame 52 has two track assemblies 62 and 64. The first track assembly 62 permits forward and rearward adjustment of the seat 30 relative to the vehicle during normal operating conditions. The seat occupant may select any one of several predetermined positions for the seat 30 along the first track 62 for comfort to suit personal requirements, as is known. The second track assembly 64 enables the seat 30 to move forward relative to the vehicle during a collision having a force component of sufficient magnitude in a direction that is head-on relative to the vehicle.

Figure 4:
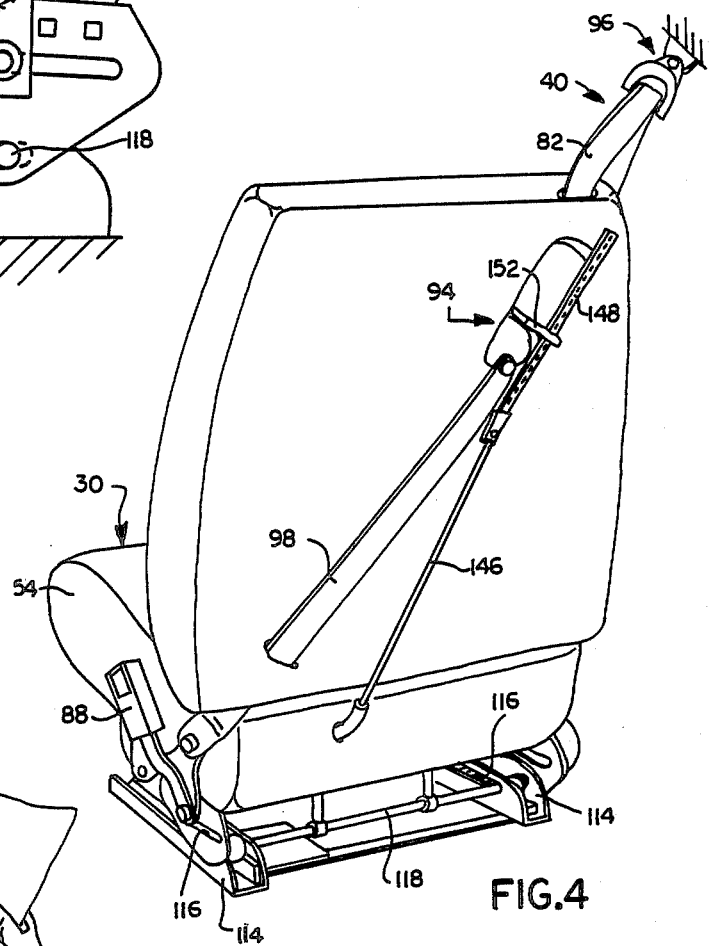
FIG. 4 is a rear perspective view of the assembly of FIG. 1.

The occupant restraint 40 includes a shoulder belt 82, a lap belt 84, a tongue 86, a buckle 88, and a pair of belt retractors 92, 94. The shoulder belt 82 extends from the retractor 94 (FIG. 4). The retractor 94 is connected with the frame 52 by a rigid frame strap 98 in the backrest 56. The shoulder belt 82 extends through a top portion of the backrest 56 and through a D-ring 96 supported from the roof or door pillar of the vehicle. The other end of the shoulder belt 82 is sewn to the lap belt 84 which is connected with the tongue 86. The shoulder belt 82 is extendable about the upper torso of the vehicle occupant seated on the seat 30. The shoulder belt 82 is tightened about the torso of the occupant during a collision, as described below.

The lap belt 84 extends in a known manner from the retractor 92 fixed to the seat frame 52 and extends about the lower torso of the occupant. The lap belt 84 has an end attached to the tongue 86. The lap belt 84 does not tighten as the seat 30 moves during a collision, but moves with the seat. The tongue 86 can be engaged with a known buckle 88 (FIG. 3) connected with the seat frame 52 to hold the belts 82, 84 in place. The retractors 92, 94 may include known cinch or comfort mechanisms.

Figure 8:
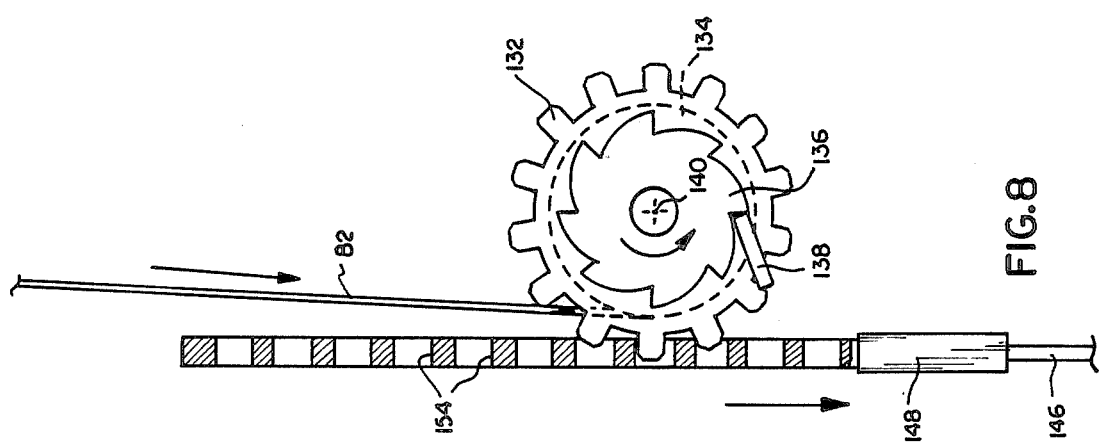
FIG. 8 is an enlarged schematic view, partly in section, of a portion of the actuator mechanism of FIGS. 6 and 7.

The retractors 92, 94 lock in response to vehicle deceleration in a known manner, thereby preventing withdrawal of belt webbing. Actuation can be effected by a known inertia sensitive mechanism, a web sensitive device, or an electrically responsive device. The retractor 94 includes a retractor frame (not shown) supporting a spool 134 (FIG. 8) for rotation. Belt webbing 82 is wound about the spool 134. The webbing of belt 82 can be retracted onto or withdrawn from the spool 134 as a result of spool rotation. The retractor 94 has a spring (not shown) which biases the spool 134 to retract the belt. The retractor 94 also includes a known ratchet wheel 136 and pawl 138. The pawl 138 pivots to lock the ratchet wheel 136 from rotating, thereby preventing withdrawal of belt 82 from the spool 134. The retractor 92 is constructed in a similar manner.

The frame 52, as described above, includes two track assemblies 62, 64 on which the seat 30 is supported for movement relative to the vehicle. The first track assembly 62 includes a known adjustment mechanism 102 (FIG. 3) for changing and locking the position of the seat 30 relative to the vehicle during normal vehicle operating conditions. The mechanism 102 includes a lever 104 (FIG. 1) to be operated by the seat occupant and a known linkage (not shown) which actuates a pawl 106 (FIG. 3) to extend into or withdraw from openings 108 in the frame 52. The openings 108 in the frame 52 permit the seat 30 to be locked in one of several positions along the first track assembly 62 relative to the vehicle.

Figure 9:
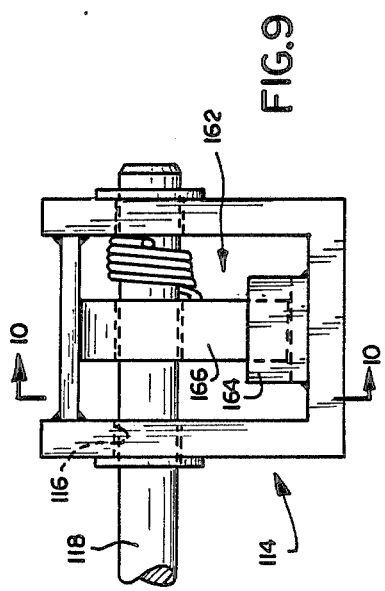
FIG. 9 is a rear view of a rebound prevention mechanism embodied in the assembly of FIG. 1.

The second track assembly 64 permits forward movement of the seat 30 relative to a vehicle during a collision. The collision must have a head-on force component of sufficient magnitude before the seat 30 will move forward relative to the vehicle. The second track assembly 64 includes a front portion 72 and a rear portion 112. The rear portion 112 has a pair of tracks 114 (FIG. 4) which are U-shaped in transverse section (FIG. 9). Each track has a slot 116 through which a bar 118 fixed to the seat 30 extends. The slots 116 extend generally parallel to the floor 60 of the vehicle. The length of the slots 116 determines the amount of relative travel between the seat 30 and the vehicle. In the preferred embodiment, six inch long slots 116 are used. The bar 118 also serves as a pivot when the seat 30 moves upwardly as described below.

The front portion 72 of the frame 52 has a pair of inclined plates 120. Each of the plates 120 has a slot 122 through which a bar 124 fixed to the seat 30 extends. The slot 122 extends upwardly from the vehicle floor 60 at an acute angle A. The angle A is selected to prevent forward movement of the seat 30 relative to the vehicle during levels of deceleration such as may be encountered during a panic stop. However, the angle A of the front portion 72 permits forward movement of the seat during a collision having a force component of sufficient magnitude to overcome the blocking effect of the incline of the slots 122. In the preferred embodiment, the angle A is shown to be 30° which requires a deceleration rate in a head-on direction exceeding 1.0 g to overcome the blocking effect of the incline of the slots 122. The retractors 92, 94 lock during a deceleration of a predetermined level in any direction of approximately 0.6 g.

The upward angle of the slots 122 forces the forwardmost part 74 of the seat portion 54 upwardly during forward movement of the seat 30. This helps prevent the occupant from sliding under the lap belt 84 during a collision due to continuing movement of the occupant as a result of the occupant's momentum. Raising the forwardmost part 74 of the seat portion 54 also downwardly pivots the backrest 56 about the bar 118.

A drive gear 132 (FIGS. 6, 7 and 8) is connected with the spool 134 of the shoulder belt retractor 94. The drive gear 132 is rotatable about the longitudinal axis 140 of the spool 134. The drive gear 132 is operable to wind the shoulder belt webbing 82 onto the spool 134 to tighten the belt webbing against the occupant. Tightening the belt webbing pulls the occupant rearwardly against the backrest 56 and maintains the occupant firmly against the backrest. This results in reduced head excursion during a collision.

An actuator mechanism 142 (FIGS. 6 and 7) responsive to forward movement of the seat 30 during a collision rotates the drive gear 132 to wind the belt webbing 82 onto the spool 134. The actuator mechanism 142 includes a pulley 144, a cable 146, a drive bar 148, and a retractor 150. The retractor 150 is similar in construction to the retractors 92, 94. The retractor 150 is fixed to the frame 52 under the seat 30 and does not move relative to the vehicle. Seat belt webbing 152 is wound on the spool of the retractor 150 and the free end of the webbing is fixed to one end of the cable 146.

Figure 5:
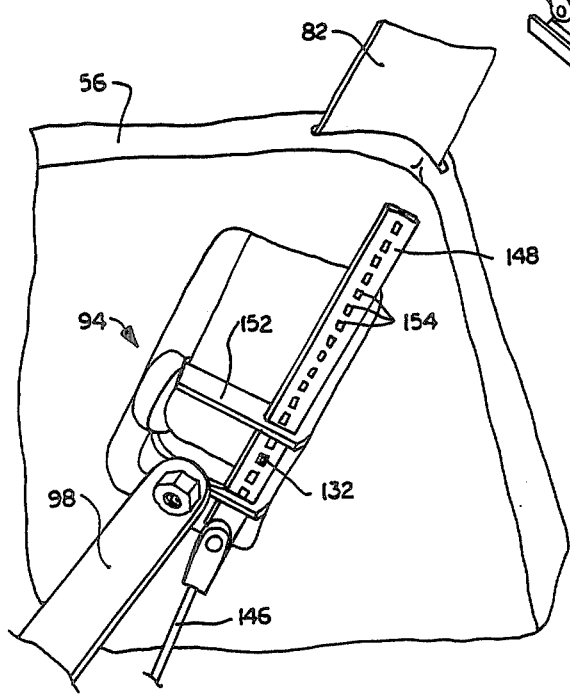
FIG. 5 is an enlarged view of a shoulder belt retractor and drive mechanism embodied in the assembly of FIG. 1.

The cable 146 extends forward of the retractor 150 and is wrapped approximately halfway around the pulley 144. The pulley 144 is mounted on the seat 30 forward of the retractor 150 and moves with the seat 30. The cable 146 extends rearwardly from the pulley 144 under the seat portion 54 and upwardly through the backrest 56. The other end of the cable 146 is fixed to the drive bar 148. The drive bar 148 is elongated and has a plurality of slots 154 disposed in a linear array along the longitudinal axis of the drive bar. The slots 154 of the drive bar 148 mesh with teeth of the drive gear 132. The drive bar 148 is supported for reciprocating movement by a frame 152 (FIG. 5) which is fastened to the frame strap 98.

The retractor 150 locks during a collision so the first end of the cable 146 does not move relative to the vehicle as the pulley 144 moves forward with the seat. Movement of the pulley 144 causes the cable 146 to pull the drive bar 148 downwardly relative to the backrest 56 of the seat 30 a distance substantially equal to the distance that the seat moves forward. As the drive bar 148 is pulled downwardly by the cable 146 relative to the backrest 56, the drive gear 132 is rotated by the drive bar to wind the shoulder belt webbing 82 onto the spool 134. Thus, during forward movement of seat 30 in a collision, the shoulder belt webbing 82 is tightened against the seat occupant.

It should be apparent that the ratio between the amount of belt webbing 82 wound onto the spool 134 and the amount of movement of the seat 30 during a collision can be changed. For example, using a drive gear 132 of a smaller diameter will wind more belt webbing 82 onto the spool 134 for a given amount of movement of the seat 30. Using a smaller diameter drive gear 132 may also require a change in the spacing of the slots 154 of the drive bar 148 and a change in the thickness of the teeth of the drive gear 132.

The retractor 150 allows retraction and withdrawal of the belt webbing 152 during adjustment of the seat 30 along the first track 62 during normal operating conditions and does not cause the webbing to tighten or loosen about the occupant during such adjustment. The first end of the cable 146 can thus move with the seat 30 during adjustment along the first track 62. The shoulder belt webbing 82, in turn, will remain in the same relative position about the occupant before, during and after the seat 30 adjustment.

Figure 10:
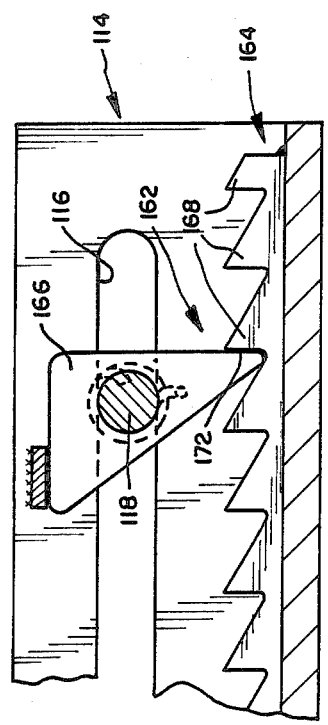
FIG. 10 is a side view of the rebound prevention mechanism, taken approximately along line 10—10 of FIG. 9.

The frame 52 also includes a mechanism 162 (FIGS. 9 and 10) which minimizes rebound of the seat 30 in a rearward direction after it moves forward during a collision. The mechanism 162 includes a ratchet bar 164 and a pawl 166. The ratchet bar 164 is fixed to one of the tracks 114 of the frame 52. The ratchet bar 164 is disposed between the legs of the U-shaped track 114 with its teeth 168 presented upward toward the open end of the U. The pawl 166 is rotatably supported by the bar 118 which is above the ratchet teeth 168. When the seat 30 moves forward relative to the frame 52 during a collision, the pawl 166 ratchets over ratchet teeth 168. When the forward movement of the seat 30 has stopped, the seat generally tends to rebound rearwardly. When the seat 30 moves rearwardly a relatively short distance, which is no greater than the length of a ratchet tooth 168, the pawl 166 pivots downwardly to engage the forward face 172 of a tooth and block rearward movement of the seat.

Thus, with the present invention, during a collision having a sufficient force component in a head-on direction, kinetic energy of the seat 30 is used to protect the occupant. The momentum of the seat 30 continues to move the seat relative to the vehicle during the collision. The continued forward movement of the seat 30 is transmitted to the shoulder belt retractor 94 by the actuator mechanism 142 to tighten the shoulder belt 82 about the occupant. A test conducted on an assembly 20 constructed according to the present invention, in comparison to a fixed seat having a belt system anchored to the vehicle, indicates that a three inch reduction of head excursion on a fiftieth percentile test dummy was achieved during a 20 mph head-on collision.

If a vehicle having the assembly 20 installed according to the present invention collides with an object so as to have a force component in a head-on direction over a predetermined level, all of the retractor mechanisms 92, 94, 150 mounted on the assembly 20 will lock and prevent withdrawal of belts 82, 84, 152. The seat 30 will tend to move in a forward direction relative to the vehicle. The momentum of the seat 30 will overcome the blocking effect of the incline of the slots 122. The bar 118 will move forwardly along the slot 116 and the bar 124 will move forwardly and upwardly along the slot 122. The forwardmost part 74 of the seat portion 54 will move upwardly and the backrest 56 will pivot downwardly about the bar 118. As the seat 30 moves forward, the pulley 144 will move with the seat. This will pull the second end of the cable 146 downwardly because the retractor 150 is locked and is holding the first end of the cable 146 in place. The cable 146 will pull the drive bar 148 downwardly relative to the backrest 56 of the seat 30 a distance substantially equal to the distance that the seat moves forward. The drive bar 148 will rotate the drive gear 132 to wind the shoulder belt webbing 82 onto the retractor spool 134 and tighten the shoulder belt webbing against the occupant. This will restrain the occupant from moving forwardly relative to the backrest portion 56 of the seat 30. The mechanism 162 will prevent the seat 30 from moving rearwardly along the second track 64 after the seat has moved forward. Thus, occupant rebound off of the backrest portion 56 is reduced because forward occupant movement is minimized relative to the backrest portion and some of the collision energy is dissipated by the moving seat 30.

In the preferred embodiment, deceleration of the vehicle and momentum of the seat 30 causing relative movement during a collision is described. It will be apparent that relative movement and momentum between the seat 30 and the vehicle may result from circumstances other than deceleration of the vehicle. For example, a first vehicle having the assembly 20 may be at a standstill and then be struck by a second vehicle causing relative movment and momentum between the seat and the first vehicle. In this case, the occupant is still protected by the assembly 20.

From the above description of a preferred embodiment of the invention, those skilled in the art will perceive improvements, changes and modifications. Such improvements, changes and modifications within the skill of the art are intended to be included herein and covered by the appended claims.

Having described a specific preferred embodiment of the invention, I claim:

1. An assembly for use in a vehicle, said assembly comprising:
   a seat for a vehicle occupant,
   means for supporting said seat for forward movement relative to the vehicle during a collision;
   a belt retractor mounted on said seat and movable therewith and having belt webbing wound thereon, said belt webbing being extendable about an occupant for restraining movement of the occupant relative to said seat and being retractable onto said retractor to tighten the belt webbing about the occupant;
   actuatable drive means for tightening the belt webbing about the occupant; and
   actuation means responsive to movement of said seat during a collision for actuating said drive means to tighten said belt webbing against the occupant.

2. An assembly as set forth in claim 1 wherein said means for supporting said seat includes a frame and means for attaching said frame to the vehicle, said frame including means for blocking forward movement of said seat in the event of deceleration of the vehicle below a predetermined level of deceleration, said frame also including means for raising the forwardmost portion of said seat during forward movement of said seat.

3. An assembly as set forth in claim 1 wherein said drive means includes a gear connected to a rotatable spool of said retractor for rotation with the spool, said spool having seat belt webbing wound thereon.

4. An assembly as set forth in claim 1 further including means for blocking rearward movement of said seat after said seat moves forward relative to the vehicle during a collision.

5. An assembly for use in a vehicle, said assembly comprising:
   a seat for a vehicle occupant;
   support means for supporting said seat for forward movement relative to the vehicle during a collision of the vehicle as a result of relative momentum between said seat and the vehicle;
   a belt retractor mounted on said seat and movable therewith and having a spool with belt webbing wound thereon which is extendable about the occupant for restraining movement of the occupant relative to said seat;
   means for winding said belt webbing onto said spool and for mechanically transmitting forward seat movement to wind said belt webbing onto said spool to tighten said belt webbing against the occupant during a collision of the vehicle.

6. An assembly as set forth in claim 5 wherein said support means includes a frame and means for attaching said frame to the vehicle, said frame including means for blocking forward movement of said seat during deceleration of the vehicle below a predetermined level of deceleration.

7. An assembly as set forth in claim 6 further including means for raising the forwardmost portion of said seat during forward movement of said seat.

8. An assembly as set forth in claim 7 wherein said means for blocking forward movement of said seat and said means for raising the forwardmost portion of said seat comprise at least one surface means attached to the vehicle and extending upwardly away from the floor of the vehicle at an acute angle for engaging a portion of said seat.

9. An assembly as set forth in claim 5 further including a second belt retractor mounted on said seat and having a spool with belt webbing wound thereon which is extendable about the lower torso of the occupant in said seat for restraining movement of the occupant relative to said seat.

10. An assembly as set forth in claim 5 wherein said seat includes a backrest portion, said belt retractor being mounted on said backrest portion and disposed so that a portion of said belt webbing extends from a top portion of said backrest portion for extending about the upper torso of the occupant.

11. An assembly as set forth in claim 5 wherein said drive means includes a gear connected to said spool for rotation with the spool about its longitudinal axis.

12. An assembly as set forth in claim 5 further including means for preventing rearward movement of said seat after said seat has started to move forward during a collision.

13. An assembly as set forth in claim 12 wherein said means for preventing rearward movement of said seat includes a ratchet bar and a pawl, said ratchet bar being connected with said support means and having a plurality of ratchet teeth spaced therealong in a linear array parallel to the direction of seat movement, said pawl being supported for pivotal movement by said seat, said pawl being pivotable over said ratchet teeth upon forward movement of said seat and pivotable into engagement with a forwardly facing side of one of said ratchet teeth for blocking rearward movement of said seat.

14. An assembly for use in a vehicle, said assembly comprising:
   a seat for a vehicle occupant,
   means for supporting said seat for forward movement relative to the vehicle during a collision;
   a belt retractor mounted on said seat and having belt webbing wound thereon, said belt webbing being extendable about an occupant for restraining movement of the occupant relative to said seat and being retractable onto said retractor to tighten the belt webbing about the occupant;
   actuatable drive means for tightening the belt webbing about the occupant; and
   actuation means responsive to movement of said seat during a collision for actuating said drive means to tighten said belt webbing against the occupant;
   said means for supporting said seat including a frame and means for attaching said frame to the vehicle;
   said actuatable drive means including a gear connected to a rotatable spool of said retractor for rotation with the spool, said spool having seat belt webbing wound thereon;
   said assembly further including a pulley connected with said seat, said actuation means including a cable extending about said pulley and having one end portion connected with said frame and another end portion drivingly coupled with said gear.

15. An assembly for use in a vehicle, said assembly comprising:

a seat for a vehicle occupant;

support means for supporting said seat for forward movement relative to the vehicle during a collision of the vehicle as a result of relative momentum between said seat and the vehicle;

a belt retractor mounted on said seat having a spool with belt webbing thereon which is extendable about the occupant for restraining movement of the occupant relative to said seat;

means for winding said belt webbing onto said spool and for mechanically transmitting forward seat movement to wind said belt webbing onto said spool to tighten said belt webbing against the occupant during a collision of the vehicle;

said winding means including a gear connected to said spool for rotation with the spool about its longitudinal axis;

said means for mechanically transmitting forward seat movement including a pulley rotatably supported by and movable with said seat, a cable extending about said pulley and having a first end portion connected with said support means and a second end portion connected with a drive bar, said drive bar being engageable with said gear, upon forward seat movement during a collision said pulley moving an intermediate portion of said cable to pull said second end portion of said cable and said drive bar to rotate said gear for tightening said belt webbing about the occupant.

* * * * *